May 23, 1944.  I. E. MUSKAT  2,349,747
CHLORINATION OF CHROMIUM BEARING MATERIALS
Filed Feb. 8, 1941
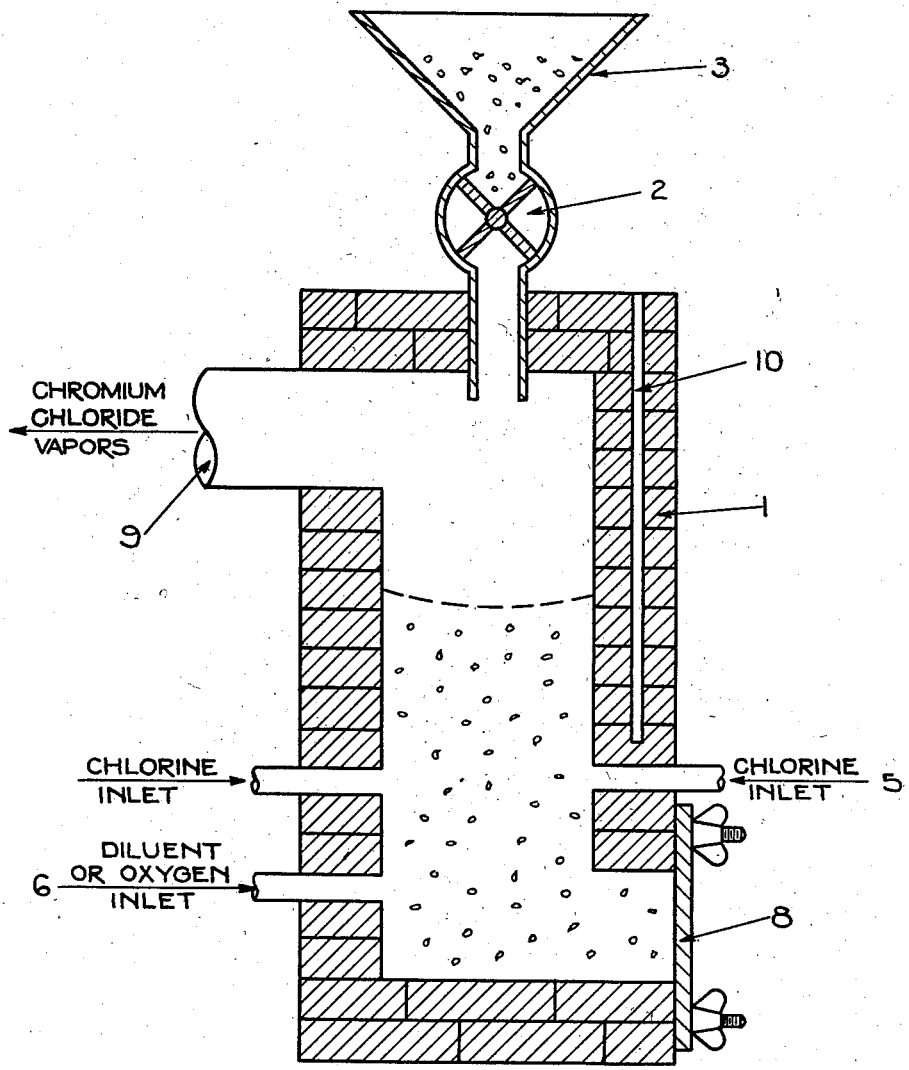
INVENTOR.
IRVING E. MUSKAT
BY
ATTORNEY.

UNITED STATES PATENT OFFICE 2,349,747

CHLORINATION OF CHROMIUM BEARING MATERIALS

Irving E. Muskat, Akron, Ohio, assignor to Pittsburgh Plate Glass Company, Allegheny County, Pa., a corporation of Pennsylvania Application February 8, 1941, Serial No. 378,084

13 Claims. (Cl. 75—112)

This invention relates to the chlorination of chromium bearing materials and particularly is directed to the treatment of chromium bearing ores such as chromite ore. In United States Letters Patent Nos. 2,133,997 and 2,133,998, granted to C. G. Maier, methods are described for the chlorination of chromium bearing ores. In accordance with the methods therein described, it was found that upon chlorination of such ores serious difficulty was encountered in securing volatilization of the chromium chlorides which were formed and in preventing sintering or bridging of the furnace during the chlorination. In order to avoid these difficulties, the patentee suggested the use of (1) inert carrier particles upon which a film of chromite-carbon mixture is deposited, and (2) an amount of chlorine substantially in excess of the concentration required for complete chlorination of the ore. It is readily seen that this process is open to certain objections by reason of the large quantity of chlorine required and also because of the fact that the use of carrier particles reduces the output of a furnace and the preparation and use of such particles involves additional expense.

In accordance with the present invention, I have found that it is possible to conduct the chlorination without use of such carrier particles and using substantially less chlorine than has previously been regarded as essential. I have found that the chlorination of chromium bearing materials may be conducted efficiently by regulating the amount of chlorine which is introduced into the furnace, whereby upon condensation of the vapors, withdrawn, a condensate of chromous chloride or chromic chloride and chromous chloride is obtained.

The temperature of the chlorination should be sufficiently high to insure vaporization of chromous chloride and, in general, should not be less than 900° C. In order to assist the vaporization at such temperature it is found desirable to introduce a gaseous medium into the furnace. Inert gases such as nitrogen, or carbon monoxide, may be utilized, if desired. It is found preferable to introduce a gaseous agent capable of preventing sintering within the furnace and such agent may be used in lieu of or in conjunction with inert gases. Air or oxygen are particularly suitable for this purpose, and in general, the chlorination is conducted in the presence of a substantial quantity of this agent. Other agents capable of minimizing sintering such as are described in my copending application Serial No. 310,537, filed December 22, 1939, may also be used. By this means it is possible to avoid sintering which normally occurs due to formation of sintering compositions such as liquid or semi-liquid magnesium, chromous or ferrous chloride.

In order to obtain a more complete volatilization of the chromous chloride formed, it is often found desirable to conduct the chlorination at a temperature substantially above 900° C. Thus, in many cases the temperature of chlorination within at least a portion of the bed of ore undergoing chlorination is maintained above about 1250° C.

In the operation of the present process, difficulty may be encountered due to attack of the reactor by the chlorinating agent. This is particularly true when an externally heated reactor is used since such reactors are ordinarily constructed of heat conducing materials and such materials are readily attacked by chlorine.

In accordance with the present invention, it is preferable to conduct the chlorination in a shaft furnace which is constructed of a chlorine resistant refractory material. In most cases, such furnaces are not capable of being externally heated. It has been found, however, that by conducting the reaction above about 900° C., the chlorination takes place at a rate such that the heat evolved therefrom is sufficient to maintain the temperature of the reaction. Thus, the chlorination may be conducted without externally heating the furnace by regulating the rate of introduction of chromium bearing material, chlorine and a reducing agent such as carbon or other carbonaceous material, such that the heat evolved during the chlorination is sufficient to maintain the temperature above about 900° C. and preferably above 1250° C.

In general, it is found desirable to chlorinate the chromium bearing material in the presence of a suitable reducing agent such as carbon, coal, coke, petroleum coke, peat, charcoal, or other carbonaceous material, or other reducing agent. The carbon concentration in the ore-carbon mixture may be varied in accordance with the amount of oxygen introduced into the furnace and with the composition of the ore. With high concentrations of air, correspondingly high concentrations of carbon are generally desirable while with lower air concentrations, the carbon concentration may be correspondingly low. The carbon concentration is also governed by the amount of chromium and iron and other chloridizable metals in the ore since with high chromium and iron concentrations, the carbon should be correspondingly high and with lower concentrations of these metals, the carbon required is correspondingly low. In treating an ore containing 20 percent chromium, 15 percent iron, 7.2 percent magnesium and 6.4 percent aluminum, in excess of 30 percent carbon based upon the weight of the ore may be used although somewhat lower concentrations may also be effective when the process is conducted in the presence of a substantial quantity of air, for example, 1 volume or more of air per volume of chlorine. On the other hand, when no air is utilized, as little as 10 percent carbon often is found suitable. The ore undergoing treatment may be of any convenient form but is preferably finely ground, for example, to minus 100 mesh, and thereafter is mixed with the carbonaceous material. While this mixture may be treated as such, it is generally preferred to briquette the mixture with a suitable binder, such as molasses or still-residue from the distillation of petroleum and to bake these briquettes at a temperature of approximately 500-700° C. Thereafter, the briquettes may be subjected to the chlorination hereafter described.

It is found that by operation of the present process, it is possible to regulate the amount of chromous chloride produced to a substantial degree by regulation of the quantity of chlorine introduced into the reactor. Thus, where the amount of chlorine is approximately equal to, or greater than, the stoichiometric quantity of chlorine required to chlorinate the chloridizable constituents of the ore and to form chromic and ferric chlorides upon condensation of the vapors, in general, little if any, chromous chloride is obtained. On the other hand, by reducing the quantity of chlorine, a substantial quantity of chromous chloride is found in the condensed chlorides of chromium, and if desired, it is possible to conduct the operation in a manner such that the major portion or substantially all of the chromium in the material undergoing chlorination is converted to chromous chloride. In most cases, it is desired to conduct the chlorination in a manner such that at least about 10 percent of the total chromium therein is converted to chromous chloride. By this means it is found that improved condensation and chlorine utilization may be secured. In treating an ore having the following analysis:

29.2% Cr, 17% Fe, 7.25% Mg, 6.83% Al approximately 1.1 to 1.4 lbs. of chlorine are used per pound of ore.

As previously noted, introduction of a gaseous agent such as oxygen or an inert gas or both is often desirable. The amount required is dependent to a large degree upon the sintering characteristics of the ore undergoing treatment and the amount of chromous chloride produced. In general, where oxygen is utilized, at least 3 percent oxygen based upon the volume of chlorine should be utilized and generally, approximately 1 to 5 volumes of air per volume of chlorine is utilized. Where diluent gases are introduced, the proportions of such gases utilized are generally dependent upon the temperature. Thus, when the temperature is maintained at 1250° C. or above, one-half to three volumes of diluent per volume of chlorine are found satisfactory. On the other hand, at lower temperatures, for example, 900° C, five or ten or more volumes of diluent may be required. Excessive quantities of diluents are undesirable since in such a case the rate of reaction may be substantially decreased. Preferably, the amount of chlorine should comprise not substantially less than 10 percent by volume of the total gas introduced into the chlorination chamber.

The accompanying drawing diagrammatically illustrates a suitable apparatus for conducting the process in accordance with my invention. This apparatus comprises a suitable shaft furnace 1, which may be constructed from firebrick or other resistant material and which is provided with chlorine tuyères 5, and one or more tuyères 6, for introduction of oxygen, air and/or inert diluent gas. In the ordinary operation of this furnace, a charge of coke may be introduced into the furnace, a blast of air or oxygen introduced through the tuyères 6, and the coke ignited. When the temperature has reached a suitable value, for example, 900° C., a charge of briquettes containing ore and carbon may be introduced by means of feeding device 2, from a storage hopper 3. At this time chlorine is introduced into the furnace and oxygen and/or nitrogen and/or other diluent is introduced through tuyères 6, and flow rates of chlorine and oxygen and/or gaseous diluent adjusted in accordance with the amount of ore introduced, to insure vaporization of the chlorides of chromium and to prevent or minimize sintering of the bed during chlorination. Additions of ore may be either continuous or intermittent. The base of the furnace is provided with a suitable door or other closure 8, at which ash and unchlorinated ore may be withdrawn continuously or intermittently. The iron and chromium chlorides which volatilize are withdrawn through outlet pipe 9, and may be led to suitable condensers (not shown).

In order to maintain the process in continuous operation, it is preferred to introduce the iron, carbon and chlorine at such a rate that the temperature is maintained above 850 to 900° C. preferably at above 1250° C. Ordinarily, this may be done by regulating the rate of introduction of chlorine, oxygen and carbon-ore mixtures or briquettes in accordance with periodic or continuous observation of the temperature in the reactor. Thus, if the temperature begins to decrease, the rate of introduction of the chlorine and/or of the ore-carbon mixture may be increased while if the temperature increases, the rate of ore, carbon and chlorine introduction may be decreased. The temperature may also be regulated to some degree by controlling the rate of withdrawal of the chlorinated residue since a large amount of heat may be dissipated by rapid removal of the residue and the reactor cooled by the cool incoming ore. If difficulty is encountered in maintaining the temperature by the heat of the chlorination reaction, carbon lumps may be added to the reaction zone with or without a charge of briquettes and air or oxygen introduced to burn sufficient carbon to raise the temperature to the desired value. In addition, briquettes containing an increased concentration of carbon may be added.

By this means a gaseous mixture containing vaporized chlorides of chromium together with some chlorides of iron are obtained. While the exact composition of such vapors has not been ascertained in view of the obvious difficulties of analysis of vapors at such high temperatures, upon condensation thereof ferrous and chromous chlorides are obtained and in some cases, the condensate may also contain ferric and chromic chloride. Accordingly, it appears that the vapors may comprise a mixture of these chlorides together with carbon monoxide and/or dioxide and more or less nitrogen. These vapors may be condensed by any suitable means. If desired, the condensation may be conducted in the presence of chlorine or the condensed chromium chloride may be treated with chlorine in order to convert the chromous chloride to chromic chloride and to assist in the removal of ferrous and ferric chloride and the production of substantially pure chromic chloride.

The following example is illustrative:

Example I

A quantity of briquettes ¼ to 1 inch in diameter were prepared from a mixture of 100 parts by weight of ore, 17 parts by weight of ground coke, and 12 parts by weight of molasses, by firing at 500° C., until the volatile hydrocarbons were substantially removed. The ore contained 29.2% Cr, 17.0% Fe, and 7.2% Mg.

A shaft furnace having an internal diameter of 16 inches was preheated by a coke fire within the shaft at 1000° C. At this time a charge of briquettes were added and chlorine and oxygen were introduced into the base of the shaft to initiate the chlorination reaction. After inception of the reaction, the oxygen flow was discontinued. The process was carried on continuously for many hours by introducing briquettes at a rate of 0.40 kg. per minute, chlorine at a rate of 160 liters per minute, and nitrogen preheated to 1000° C. at the rate of 250 liters per minute. The temperature remained above about 1250° C. throughout the reaction, and the chloride vapors given off were recovered and condensed to recover chromium and iron chlorides. After condensation of the chromium chlorides, it was found that approximately 75 percent of the chromium halide isolated was chromous chloride.

Example II

A quantity of briquettes ¼ to 1 inch in diameter were prepared from a mixture of 100 parts by weight of ore, 45 parts by weight of ground coke and 12 parts by weight of molasses by firing at 500° C. until the volatile hydrocarbons were substantially removed. The ore contained 29.2% Cr, 17.0% Fe, 7.2% Mg and 6.8% Al.

A shaft furnace having an internal diameter of 16 inches was preheated by a coke fire within the shaft at 1000° C. At this time a charge of briquettes was added and chlorine and oxygen were introduced into the base of the shaft to initiate the chlorination reaction. The process was carried on continuously for many hours by introducing briquettes at a rate of 126 pounds per hour, chlorine at a rate of 125 pounds per hour and air at the rate of 25 cubic feet per minute. The temperature remained above about 1000° C. throughout the reaction, and the chloride vapors given off were recovered and condensed to recover chromium and iron chlorides. After condensation of the chromium chlorides it was found that approximately 20 percent of the chromium halide isolated was chromous chloride.

Hydrogen chloride, phosgene or other gaseous chlorinating agents may be used in conjunction with chlorine or in lieu thereof in accordance with my invention.

While the process has been described with particular reference to treatment of ores, it is not limited to treatment of ores since it may be applied to treatment of waste alloy compositions, metallic residues, ferrochrome, chrome pigment compositions, or other residues containing substantial amounts of this metal. In general, it is preferred to treat materials containing upward of 10 percent chromium and preferably in excess of 15 percent chromium.

In accordance with a further modification, it is possible to conduct the operation in a manner such that at least a portion of the chromous chloride is not volatilized with the chromic chloride or chromium tetrachloride. In such a case the residue after chlorination may contain chromous chloride which may be extracted with water or hydrochloric acid solution.

Although the present invention has been described with reference to specific details of certain embodiments thereof, it is not intended that such details shall be regarded as limitations upon the scope of the invention except insofar as included in the accompanying claims.

I claim:

1. A method of chlorination which comprises forming a pervious bed of chromium bearing material within a reactor, chlorinating said bed while regulating the quantity of chlorination agent to form a substantial quantity of chromous chloride, introducing a quantity of oxygen sufficient to substantially minimize sintering within the bed and maintaining the temperature sufficient to vaporize the chromous chloride.

2. A method of chlorination which comprises forming a pervious bed of chromium bearing material within a reactor, chlorinating said bed while regulating the quantity of chlorination agent to form a substantial quantity of chromous chloride, introducing a quantity of oxygen sufficient to substantially minimize sintering within the bed, maintaining the temperature of the bed above about 900° C. and vaporizing the chromium chloride.

3. A method of chlorination which comprises forming a pervious bed of chromium bearing material within a reactor, chlorinating said bed while regulating the quantity of chlorination agent to form a substantial quantity of chromous chloride, introducing a quantity of oxygen sufficient to substantially minimize sintering within the bed, maintaining the temperature of the bed above about 1250° C. and vaporizing the chromous chloride.

4. A method of chlorination which comprises forming a pervious bed of chromium bearing ore within a reactor, chlorinating said bed while regulating the quantity of chlorination agent to form a substantial quantity of chromous chloride, introducing a quantity of oxygen sufficient to minimize sintering within the bed, introducing ore, chlorine oxygen and carbonaceous material into said bed at a rate such that the heat evolved during the reaction is sufficient to maintain the temperature above 900° C. without externally heating the reactor and vaporizing the chromous chloride.

5. A method of chlorination which comprises forming a pervious bed of chromium bearing ore within a reactor, chlorinating said bed while regulating the quantity of chlorination agent to form a substantial quantity of chromous chloride, introducing a quantity of oxygen sufficient to substantially minimize sintering within the bed, introducing ore, chlorine oxygen and carbonaceous material into said bed at a rate such that the heat evolved during the reaction is sufficient to maintain the temperature above 1250° C. without externally heating the reactor, and vaporizing the chromous chloride.

6. A method of chlorination which comprises forming a pervious bed of chromium bearing material within a reactor, chlorinating said bed while regulating the quantity of chlorination agent to form a substantial quantity of chromous chloride and maintaining the temperature sufficient to vaporize the chromous chloride, and introducing ore, chlorine and carbonaceous material into said bed at a rate such that the heat evolved during the reaction is sufficient to maintain the temperature above 900° C. without externally heating the reactor.

7. A method of chlorination which comprises forming a pervious bed of chromium bearing material within a reactor, chlorinating said bed while regulating the quantity of chlorination agent to form a substantial quantity of chromous chloride and maintaining the temperature sufficient to vaporize the chromous chloride, and introducing ore, chlorine and carbonaceous material into the said bed at a rate such that the heat evolved during the reaction is sufficient to maintain the temperature above 1250° C. without externally heating the reactor.

8. The method of chlorination which comprises forming a pervious bed of chromium bearing material within a reactor, chlorinating the bed while regulating the quantity of chlorination agent to form a substantial quantity of chromous chloride, maintaining the temperature above about 900° C. and passing a gas which is substantially nonreactive with respect to the chromium chloride formed in addition to gases evolved during the reaction through the bed to vaporize the chromous chloride.

9. The method of chlorination which comprises forming a pervious bed of chromium bearing material within a reactor, chlorinating the bed while regulating the quantity of chlorination agent to form substantial quantities of chromic and chromous chlorides, maintaining the temperature above about 900° C. and passing a gas which is substantially nonreactive with respect to the chromium chloride formed in addition to gases evolved during the reaction through the bed to vaporize the chromous chloride.

10. A method which comprises forming a pervious bed comprising briquettes of chromium ore and a carbonaceous material, chlorinating the briquettes while controlling the degree of chlorination to form a substantial amount of chromous chloride and vaporizing at least a major portion of the chromous chloride formed.

11. A method which comprises forming a pervious bed comprising briquettes of chromium ore and a carbonaceous material, chlorinating the briquettes while controlling the degree of chlorination to form a substantial amount of chromous chloride, introducing sufficient oxygen into a lower portion of the bed to minimize sintering, and vaporizing at least a major portion of the chromous chloride formed.

12. The process of claim 11 wherein the chlorination is conducted above about 1250° C.

13. A method which comprises forming a pervious bed comprising briquettes of chromium ore and a carbonaceous material, chlorinating the briquettes while controlling the degree of chlorination to form metallic chlorides at least 10 percent of the chromium chlorides formed being chromous chloride, and introducing air in amount not substantially less than one volume of air per volume of chlorine into a lower portion of the bed and vaporizing at least a major portion of the chromous chloride formed.

IRVING E. MUSKAT.